March 23, 1943. J. NICOL 2,314,730
VEHICLE CONTROL MECHANISM
Original Filed Nov. 2, 1940 3 Sheets-Sheet 1

Inventor
John Nicol
By Strauch & Hoffman
Attorney

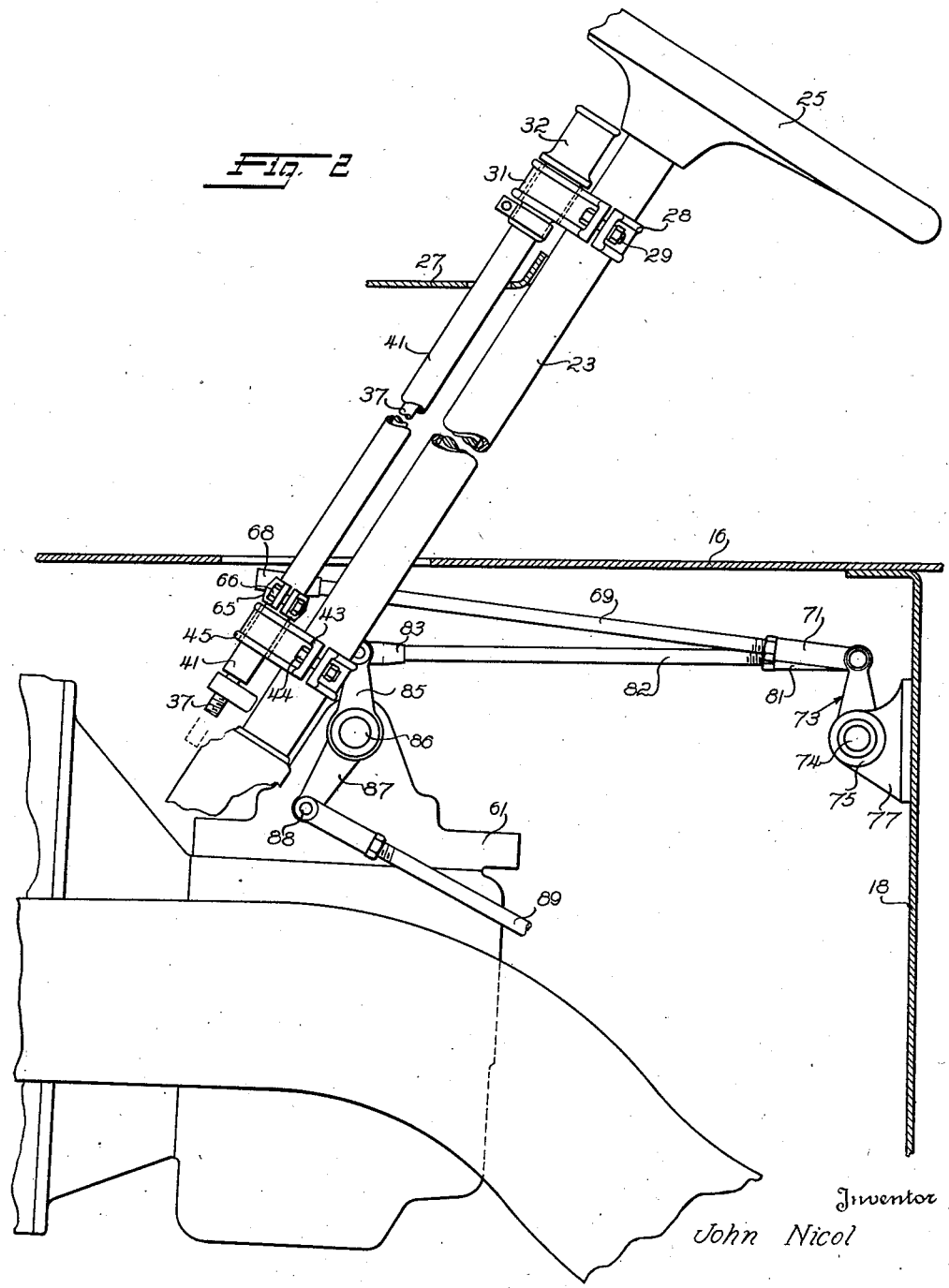

March 23, 1943. J. NICOL 2,314,730
VEHICLE CONTROL MECHANISM
Original Filed Nov. 2, 1940 3 Sheets-Sheet 3
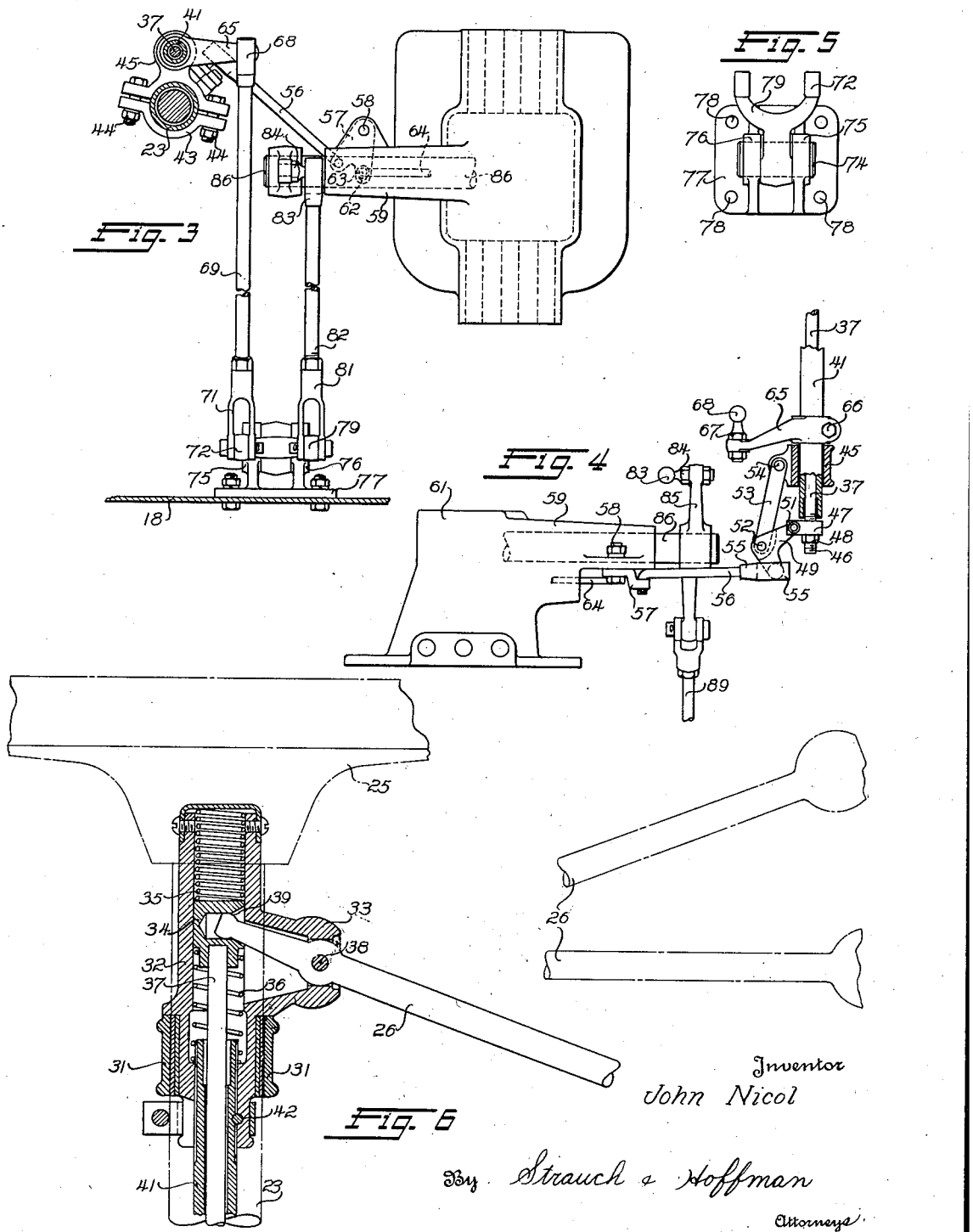
Inventor
John Nicol
By Strauch & Hoffman
Attorneys Patented Mar. 23, 1943

2,314,730

UNITED STATES PATENT OFFICE 2,314,730

VEHICLE CONTROL MECHANISM

John Nicol, Detroit, Mich., assignor to Divco-Twin Truck Company, Detroit, Mich., a corporation of Michigan Original application November 2, 1940, Serial No. 364,082. Divided and this application June 28, 1941, Serial No. 400,304

6 Claims. (Cl. 74—484)

My invention relates to vehicle control mechanism and is more particularly concerned with gear shift control mechanism wherein undesired movement due to motor reactions is eliminated.

This is a division of my co-pending application Serial No. 364,082, filed November 2, 1940.

Automotive vehicles driven by internal combustion engines are commonly provided with change speed transmissions controlled by the operator through a manual control lever. The transmission and engine housings are usually interconnected rigidly so that motor vibration due to engine torque and other operating characteristics is transmitted directly to the transmission housing and thence to the lever. This vibration is most pronounced where the engine is resiliently mounted on the chassis and is especially objectionable where the lever is mounted on the steering post assembly.

In recognition of the above problem, various devices have been designed to reduce this vibration, but most of them are objectionably complicated or inefficient.

It is accordingly a major object of this invention to provide simple and novel transmission control mechanism for an automotive vehicle in which the manual control lever is mounted on the steering post or in like position, wherein undesired vibration or movement of the lever incident to engine torque and like reactions is eliminated.

A further object of my invention is to provide novel mechanical linkage interconnecting a transmission control lever and the transmission unit in an automotive vehicle whereby vibration of the transmission will not be communicated to the lever.

It is a further object of the invention to provide in an automotive vehicle novel arrangements preventing communication of engine vibration to a transmission control lever supported by the vehicle chassis or a part rigid therewith.

A further object of the invention is to provide a novel relay mechanism between the lower end of a steering post supported transmission control member and the transmission in an automotive vehicle, whereby vibration of the transmission incident to operation of the motor will not be transmitted to the control member.

Further objects of my invention will presently appear as the description proceeds in connection with the appended claims and the annexed drawings in which:

Figure 2 is an enlarged side elevation illustrating mainly the transmission control mechanism of the vehicle of Figure 1;

Figure 3 is a top plan view of the transmission control mechanism at the bottom of the steering post;

Figure 4 is a fragmentary front elevation of the mechanism actuated by the transmission control assembly;

Figure 5 is a front elevation of the support for the relay rods in the gear changing linkage; and Figure 6 is an elevation, partly in section, of the upper end of the transmission control assembly.

Figure 1:
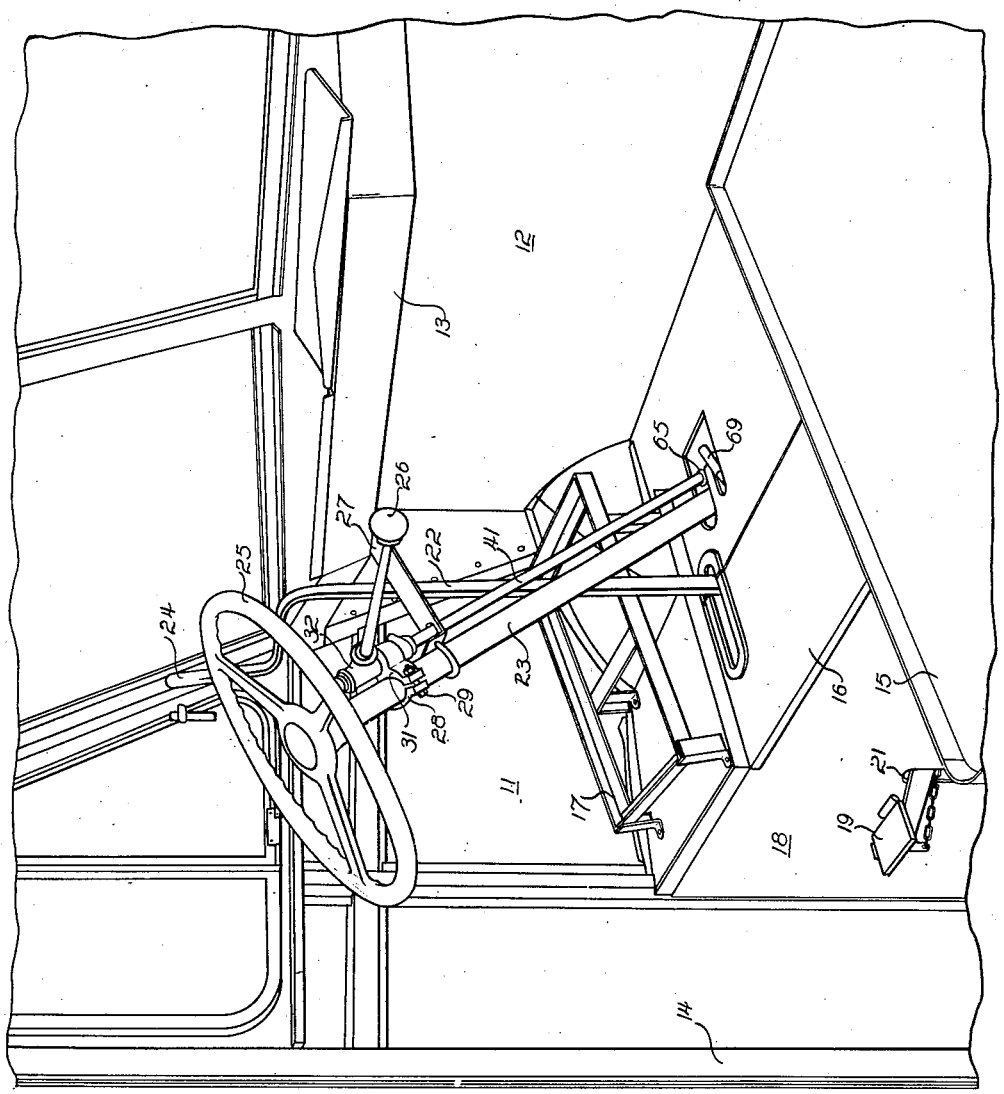
Figure 1 is a substantially perspective view illustrating a preferred embodiment of the invention in a vehicle equipped with a transmission control assembly mounted on the steering post.

Figure 1 illustrates the driver's compartment and controls of a stand drive vehicle embodying my invention. A body side wall unit 11 is attached at its front end to a body front wall 12 and an instrument board assembly 13. Adjacent the driver's compartment is the front post 14 of a side doorway opening to one end of the transverse through aisle at the rear of the driver's compartment.

Adjacent the driver's compartment is a storage compartment having a top wall 15 forming part of an elevated forward cargo platform. A contiguous wall 16 extends from wall 15 to side wall 11, and supports a milk case rack 17 to the left of the steering post. A vertical wall 18 extends from the rear edge of wall 16 to the floor (not shown) and forms the front wall of the driver's compartment. Combined clutch and brake pedal 19 projects into the driver's compartment through an opening 21 in wall 18.

The above body construction is described in detail in said application Serial No. 364,082, and need not be further explained herein as it does not comprise part of the present invention.

An elongated hand service brake lever 22 extends upwardly through floor 16 slightly to the left of steering post 23 and is provided with a laterally and upwardly bent portion terminating in a handle 24 which extends past and closely adjacent the periphery of steering wheel 25 at the left side, and is operated by the operator's left hand. The lower end of lever 22 is connected to actuate the service brake mechanism in the same manner as lever 38 in Serial No. 364,082.

The chief reason for locating lever 22 at the left of the steering wheel in this embodiment of the invention is to separate this control from possible interference with a steering post supported transmission control assembly having a laterally projecting transmission control lever or handle 26. This arrangement of the brake lever to the left of the steering wheel and the transmission control assembly on the steering post provides additional space at the front elevated floor of the vehicle for piling packages and miscellaneous similar use.

The upper end of steering post 23 is attached rigidly to the instrument board assembly 14 by a brace 27. Above brace 27, a split bracket 28 is secured rigidly to the steering post as by bolts 29. Referring to Figure 6, bracket 28 is formed with a hollow boss 31 which rotatably supports a cylindrical cap 32 having a hollow lateral projection 33. Cap 32 is formed with an axial bore in which slides a block 34. Axial sliding movement of block 34 in either direction within cap 32 is controlled by opposed springs 35 and 36.

At its lower end, block 34 is non-rotatably secured to a selector rod 37 extending parallel to steering post 23. Handle 26 is pivoted at 38 within boss 33 and its inner end is universally connected, as at 39, to block 34 so that rocking motion of the handle about pivot 38 causes axial displacement of rod 37 for a purpose later to be described. A hollow shifter rod 41, concentric with rod 37 but distinct therefrom, is non-rotatably secured to the lower end of cap 32, as by fastening element 42. Manipulation of handle 26 to rotate cap 32 about its axis thereby causes rotation of rod 41 about its axis for a purpose to be described.

At the lower end of the steering post and below floor 16 (Figure 2), a split bracket 43 substantially identical with bracket 28, is secured upon the steering post as by bolts 44. Bracket 43 is formed with an integral hollow boss 45 (Figure 3) in which the lower end of rod 41 is rotatably mounted. Rod 41 extends through and terminates a short distance below boss 45, and (Figure 4) rod 37 extends through the open end of rod 41 and terminates in a threaded portion 46 beyond the lower edge of rod 41.

A block 47 is non-rotatably secured upon the lower end of rod 37 and maintained thereupon by a suitable lock nut assembly 48. A bell crank 49, having one arm pivoted at 51 on block 47, is pivotally carried intermediate its arms by a pin 52 rigid with the lower end of a suspended link 53 pivoted at 54 upon boss 45. The other arm of bell crank 49 has a ball and socket connection 55 with one end of a link 56 which has its downturned other end pivotally mounted on one arm of a swingable lever 57. Lever 57 is pivotally mounted on a generally vertical post 58 carried by an elongated hollow boss 59 integral with transmission housing 61.

Lever 57 is formed with another arm having an elongated slot 62 providing a lost motion connection with a pin 63 rigid with a slidable gear selector rod 64 which extends from the transmission housing below boss 59.

When handle 26 is rocked about pivot 38, the resulting axial displacement of rod 37 is transmitted through bell crank 49 and rod 56 to cause rocking of lever 57 about post 58. Through the lost motion connection at 62 and 63, this rocking movement of lever 57 is transformed into sliding movement of rod 64. This sliding movement of rod 64 effects gear selector movement within the transmission housing and since the mechanism within the transmission housing is conventional further description of the same is unnecessary.

Above boss 45, an arm 65 is formed at one end with a split boss rigidly and non-rotatably secured about rod 41 as by bolts 66. The free end of arm 65 is provided with a non-rotatable ball headed stud 67 universally connected with a socket 68 at the front end of a relay rod 69. At its rear end, rod 69 is provided with a bifurcated connector 71 pivotally embracing the upper end of one arm 72 of a Y-shaped lever 73 rigid with a transverse stub shaft 74 rockably supported at opposite ends in spaced bosses 75 and 76 integral with a bracket 77 secured to the front surface of panel 18 as by bolts 78.

The other arm 79 of lever 73 is pivotally embraced by a bifurcated connector 81 rigid with the rear end of a second relay rod 82. The front end of rod 82 is provided with a socket 83 universally connected with a ball headed stud 84 rigid with the upper end of a lever 85 keyed or otherwise non-rotatably secured upon the end of transmission control shaft 86.

When handle 26 is manipulated to rock cap 32 about its axis, rod 41 is rotated about its axis and this movement is transmitted through arm 65, relay rod 69, lever 73, relay rod 82 and lever 85 to cause transmission shaft 86 to be rocked about its axis. This rocking movement of shaft 86 effects gear shifting control of conventional mechanism within the transmission housing.

Referring to Figure 2, lever 85 is formed below shaft 86 with a depending integral angular arm 87 pivotally connected at its free end at 88 to the forward end of a rearwardly and downwardly extending rod 89 which is connected to a brake ratchet dog operating lever (not shown) as described in said Serial No. 364,082.

Of special benefit in the above-described construction is the relay mechanism consisting of rods 69 and 82 and lever 73. During operation of the vehicle motor, transmission housing 61, which is rigid with the engine which in turn is resiliently supported on the vehicle frame, is subjected to considerable vibration due to torsional forces effective about an axis parallel to the drive shaft. This vibration becomes transmitted to handle 26 if arm 65 is connected directly to lever 85. Arm 65, rods 69 and 82 and levers 73 and 85 are all movable substantially normal to the direction of the forces setting up this vibration. Hence, provision of the above-described relay mechanism eliminates transmission of motor vibration from the transmission housing to the lever or handle 26.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle wherein an engine is resiliently mounted on the chassis and has a variable speed transmission secured thereto, a steering post on the chassis and extending to a point adjacent the transmission, control mechanism for the transmission comprising a manual control lever shiftably mounted near the top of said steering post, a rod paralleling said post, terminating adjacent the transmission, and operable by said lever, a support connected to a part of the chassis substantially spaced from the transmission, pivoted means on said support, means connecting the bottom of said rod to said pivoted means, and means connecting the variable speed mechanism of said transmission to said pivoted means, whereby transmission of engine vibration to said control lever is prevented.

2. Vehicle control mechanism comprising a change-speed transmission, a steering post, a rockable transmission control rod on said post terminating at its lower end adjacent said transmission, an operating handle for said rod, a rockable transmission control shaft carried by the housing of said transmission, and means operatively connecting the lower end of said rod and said shaft whereby manipulation of said handle to rock said rod causes rocking movement of said shaft, said means comprising a lever pivotally attached to a fixed part of the vehicle substantially spaced from said transmission, and relay rods connecting said lever to said rod and shaft whereby transmission of motor vibration from said housing to said handle is prevented.

3. The vehicle control mechanism defined in claim 2 wherein said rockable transmission control shaft and said pivotally attached lever are rotatable about axes substantially normal to the axis of said transmission.

4. In a vehicle wherein an engine is resiliently mounted on the chassis and has secured thereto a transmission equipped with individual gear shift and selector control devices, transmission control mechanism comprising a shifter member rockable about an axis normal to said transmission, a slidable selector member, a first lever connected to control rods terminating adjacent said members to actuate said members, means including a lost motion connection operably connecting said selector member and one of said rods, and means operably interconnecting said shifter member and the other of said rods, said last-named means including a second lever pivotally connected to said chassis at a point substantially spaced from said shifter member and its respective control rod, and relay rods pivotally attached to said second lever and to said shifter member and its respective control rod.

5. In a vehicle having a resiliently mounted engine, a change-speed transmission subject to engine vibrations, and a gear shift lever attached to a transmission control rod terminating adjacent said transmission, means operably connecting said lever and transmission but preventing transmission of engine vibrations to said lever comprising a pair of elongated relay rods pivotally connected at one end to said transmission and control rod respectively, and pivotally connected at their other ends to a lever fastened to a part of the vehicle substantially spaced from the transmission.

6. In a vehicle having a transmission equipped with a control device, a shiftable control member carried by the steering post of the vehicle and having its lower end portion extending therewith to a point adjacent the transmission, an intermediate lever pivotally connected to the chassis of said vehicle at a point substantially spaced from the transmission, a pair of rods pivotally connected at adjacent ends to said intermediate lever, means pivotally connecting the other end of one of said rods to said control device, and means pivotally connecting the other end of the other of said rods to the lower end portion of said control member where it terminates adjacent the transmission.

JOHN NICOL.